Oct. 20, 1931.  W. A. CHRYST  1,828,360
SHOCK ABSORBER
Filed Aug. 8, 1930  2 Sheets-Sheet 1

INVENTOR
BY WILLIAM A. CHRYST
ATTORNEYS

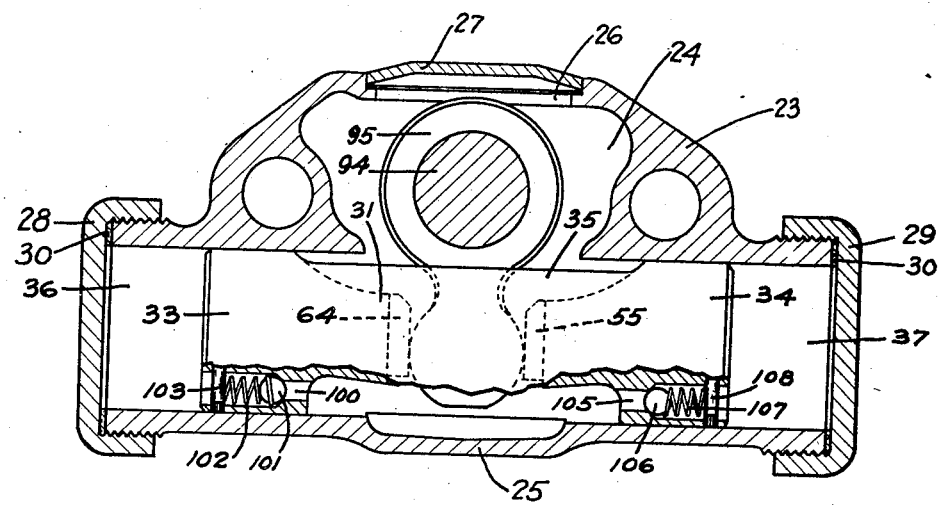
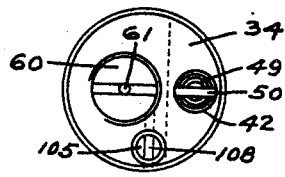
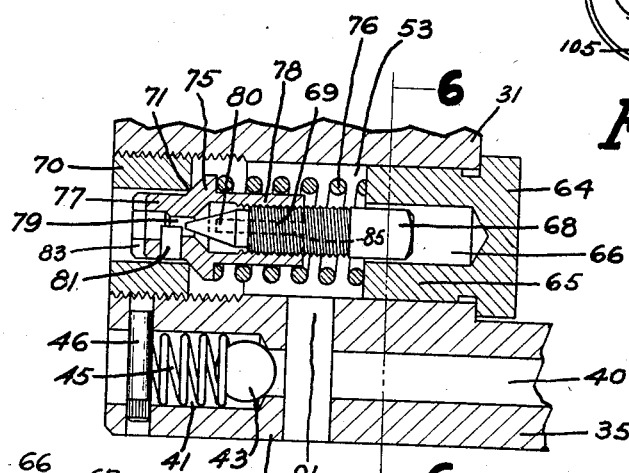
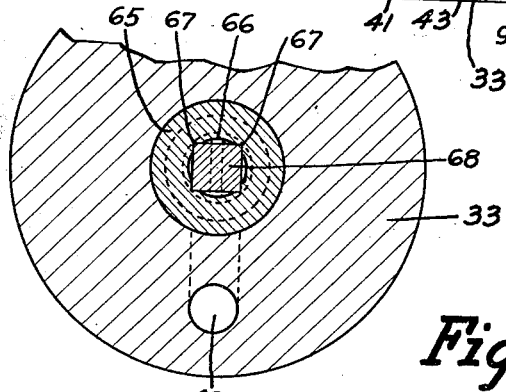

Patented Oct. 20, 1931

1,828,360

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed August 8, 1930. Serial No. 473,826.

This invention relates to improvements in hydraulic shock absorbers.

It is among the objects of the present invention to provide a hydraulic shock absorber adapted to control both the compression and the rebound movements of vehicle springs.

Another object of the present invention is to provide a double acting hydraulic shock absorber with fluid flow controlling devices of simple structure and design, carried by the fluid displacement member or piston.

Further objects and advantages of the present invention will be apparent from the following description, reference being had to the accompanying drawings, wherein a preferred embodiment of one form of the present invention is clearly shown.

In the drawings:

Fig. 4 is a fragmentary view of the shock absorber showing the fluid replenishing valves in the piston.

Fig. 5 is an enlarged, fragmentary, sectional view illustrating one fluid flow controlling device of the shock absorber.

Fig. 6 is a detail sectional view taken substantially along the line 6—6 of Fig. 5.

Fig. 7 is an end view of the piston taken in the direction of the arrows 7—7 of Fig. 2.

Figure 1:
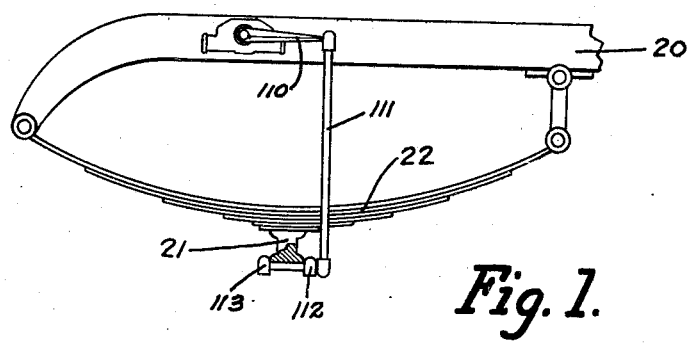
Fig. 1 is a fragmentary side view of a vehicle chassis, having a shock absorber equipped with the present invention attached thereto.

Referring to the drawings, the numeral 20 designates the frame of the vehicle supported on the axle 21 by springs 22, only one of which is shown. The road wheels of the vehicle, carried by the axle 21, have been omitted for the sake of clearness.

The shock absorber comprises a casing 23 providing a fluid reservoir 24 and a cylinder 25. An opening 26 to the fluid reservoir is closed and sealed by the cover cap 27. The open ends of the cylinder 25 are provided with cylinder heads 28 and 29 respectively, each having a suitable gasket 30 to prevent leaks at these points.

A fluid displacement member or piston 31 is reciprocably supported within the cylinder 25 said piston comprising two spaced piston head portions 33 and 34 bound together by a web portion 35. The piston head portion 33 forms the spring rebound control chamber 36 at the end of the cylinder closed by cylinder head 28, while the piston head portion 24 forms the spring compression control chamber 37 at the end of the cylinder closed by cylinder head 29.

Figure 2:
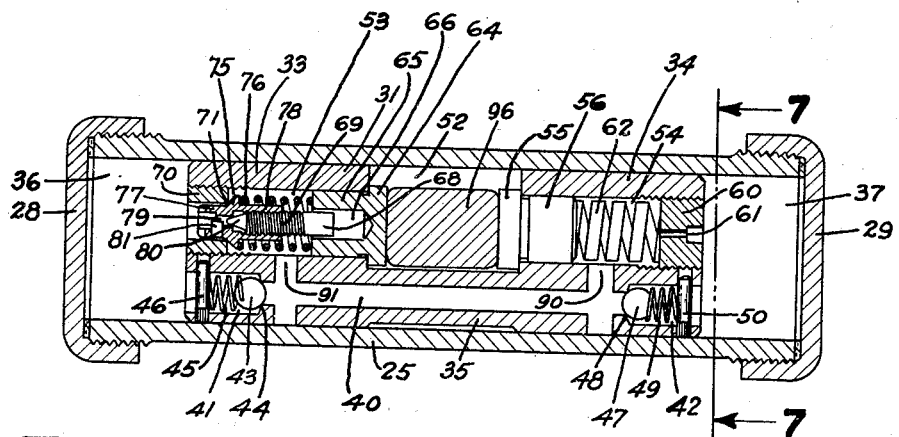
Fig. 2 is a longitudinal sectional view taken substantially along the line 2—2 of Fig. 3.
Figure 3:
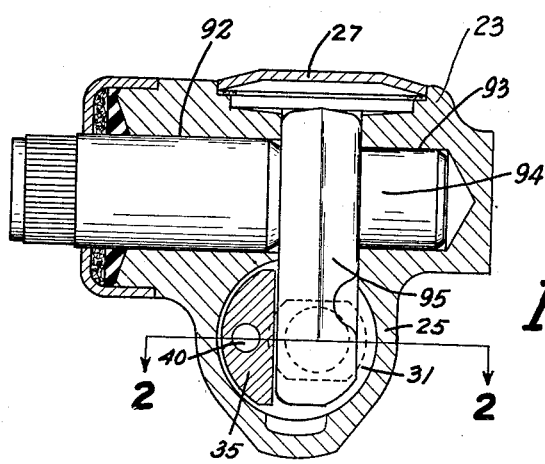
Fig. 3 is a transverse section taken through the shock absorber intermediate its ends, certain parts being shown in elevation for the sake of clearness.

Referring more particularly to Figs. 2, 3 and 5, it will be noted that the piston 31 has a duct 40 extending from one end of the piston to the other. The ends of this duct are enlarged, one opening into the spring rebound chamber and designated by the numeral 41 the other enlarged end opening into the spring compression control chamber and being designated by the numeral 42. In the portion 41 of duct 40 a ball check-valve 43 is maintained upon the valve-seat 44 by a spring 45 which engages with the cross pin 46. A similar ball check-valve 47 is in the duct portion 42 and is urged upon the valve seat 48 by spring 49 resting against cross pin 50. It may readily be seen that these valves are so constructed that they substantially prevent fluid, from their respective compression chambers, from flowing into duct 40, still fluid from said duct may flow past these valves into their respective chambers.

The relative spacing of the piston head portions 33 and 34, as has been mentioned, provides a niche 52 in the piston intermediate its ends. The piston head portion 33 has a passage 53 providing communication between the rebound control chamber 36 and the niche 52, while piston head portion 34 has a similar passage 54 between the spring compression control chamber 37 and said niche.

In the end of the passage 54, opening into the niche 52, a wear piece 55 is fitted so that its shank 56 fits slidably into the passage 54. The opposite end of passage 54, or more specifically the end opening into the spring compression chamber 37, is interiorly threaded to receive the fluid flow controlling device or metering block 60. As shown in Fig. 2, this block 60 has a central opening 61 providing a fluid flow orifice. A comparatively stiff coil spring 62 is interposed between the shank 56 of the wear piece 55 and the metering block 60, this spring 62 urging the wear piece toward the center of the niche 52 for purposes to be described.

Piston head portion 33 supports a wear piece 64 the shank 65 of which, fits tightly into the end of the piston head passage 53 opening into the niche 52. This wear piece 64 has its shank 65 recessed as at 66, the recess having rectangular corners 67 provided therein for receiving the rectangular head 68 of the metering pin 69 so that said metering pin has its head end slidably supported within the shank 65 of the wear piece 64 but not being rotatable relative thereto.

The end of the passage 53, opening into the spring rebound control chamber 36, is interiorly threaded to receive the ring member 70 which provides the annular valve seat 71 within the passage 53. The space in passage 53 between the ring 70 and the shank 65 of the wear piece may be termed a valve chamber. In this valve chamber valve 75 is provided, this valve being urged upon the valve seat 71 by the spring 76 interposed between the shank of the wear piece of said valve. The valve 75 has a tubular pilot portion 77 extending into the ring 70, this pilot portion being less in outside diameter than the interior diameter of said ring 70. A cylindrical shank 78 extends from the side of the valve 75 opposite the pilot portion 77, this cylindrical shank portion being provided with interior threads for receiving the threaded portion of the metering pin 69. The valve 75 and its pilot portion 77 have a central passage providing communication between the chamber 36 and the interior of the cylindrical shank portion 78. A restriction in this passage provides the fluid flow orifice 79 into which the tapered end 80 of the metering pin extends. The relative position of the tapered end 80 of the metering pin to the fluid flow orifice 79 may be varied by rotation of the valve 75 relative to the pin, for, as has been mentioned, the one end of the pin 69 is slidably but non-rotatably supported in the shank 65 of the wear piece 64. An opening 81 is provided in one side of the tubular pilot portion 77 of the valve 75 this opening normally coming within the ring 70 and not communicating with the valve chamber while valve 75 is maintained upon its seat 71. A transverse slot 83 in the end of the pilot portion 77 is adapted to receive a screw driver or any suitable tool by which the valve 75 is turned relative to the pin 69 for purposes of varying the fluid flow through orifice 79 of the valve 75. The cylindrical shank portion 78 of the valve 75 has slots 85 cut into it, forming sections in the shank portions which may be slightly clamped together so that they will more tightly grip the threaded portion of the metering pin 69, whereby accidental rotation of the valve 75 relative to the pin is substantially prevented.

The duct 40 communicates with the passage 54 in the piston head portion 34 through a cross passage 90. A similar cross passage 91 connects the valve chamber in passage 53 with the duct 40.

The casing 23 provides two oppositely disposed and aligned bearing portions 92 and 93 in which the rocker shaft 94 is journaled. A rocker arm 95 is attached to the rocker shaft 94 within the casing 23 the round end 96 of said shaft extending into the niche 52 of the piston and engaging the wear pieces 55 and 64. The wear piece 55 being urged into engagement with the lever portion 96 by the spring 62 will likewise urge lever portion 96 into engagement with the wear piece 65 so that wear between the lever portion 96 and the wear pieces 55 and 64 is automatically compensated for.

The rocker shaft 94 has one end extending from the casing 23, to which is connected the shock absorber arm 110. The free end of the arm 110 is swivelly attached to a connecting link 111 which is also swivelly fastened to an anchoring member 112, secured to the axle 21 by a clamping device 113.

Piston head portion 33 has a passage 100 in which a ball check valve 101 is urged upon a valve seat in passage 100 by the spring 102. A cross pin 103 provides abutment for one end of the spring 102. A similar passage 105 in the piston head portion 34 contains a ball check-valve 106 urged upon its respective seat by spring 107 which engages the cross pin 108. These two valves 101 and 106 are termed the replenishing valves for the control chambers at their respective ends of the piston, these valves permitting a flow of fluid into said chambers to replenish the fluid supply therein.

When the road wheels, not shown, strike an obstruction in the roadway spring 22 will be compressed and moved toward the frame 20 thereby causing the link 111 to operate the shock absorber arm 110 in a counterclockwise direction as regards Fig. 1. This rotates the rocker shaft 94 in a counterclockwise direction as regards Fig. 4, and thus the piston 31 will be moved toward the right, as regards Figs. 2 and 4. Pressure will now be exerted upon the fluid in the spring compression control chamber 37. Fluid pressure exerted upon valve 47 assists spring 49 to press said valve tightly upon its seat 48. The fluid in chamber 37 will be forced through the orifice 61 in the metering block 60 into the passage 54 between the block 60 and the wear piece 55. From passage 54 the fluid will flow through cross passage 90 into the duct 40, a portion flowing through the duct 91 and through slots 85 in the shank 78 of valve 75 through the orifice 79 in the valve 75 and thence into the chamber 36. Another flow of fluid from the duct 40 passes valve 43 which will now be opened against the effect of its spring 45. This flow of fluid from the spring compression control chamber 37 through the orifice 61 is restricted by said orifice, and thus the movement of the piston 31 toward the right, upon the spring compression movement is resisted, thereby resisting the spring compression movement. Variations in the size of the orifice 61 will vary the restriction to the flow of fluid from chamber 37 to chamber 36 and thus the resistance to the movement of the piston 31 on its spring compression control stroke is comparatively resisted.

When the spring 22 has reached the limit of its compression stroke, caused by the striking of the particular obstruction in the roadway, it will return through its rebound stroke to normal load position thus causing the link 111 to operate the arm 110 clockwise, resulting in a clockwise rotation of the shaft 94 and its rocker lever 95. Now the piston 31 will be moved toward the left as regards Figs. 2 and 4 and pressure will be exerted upon the fluid within the spring rebound control chamber 36. The valve 43 will be maintained in its closed position preventing fluid from entering the duct 40 past this valve. The initial flow of fluid from the chamber 36 occurs through the orifice 79 in the valve 75 past the metering pin portion 80 into the cylindrical shank 78 of the valve, thence through slots 85 in said shank into the valve chamber formed in the passage 53. From the valve chamber the fluid will flow through cross passage 91 into the duct 90, the fluid from said duct passing into the chamber 37 through the fluid flow orifice 71 and past the valve 47 which will now be opened. If the fluid pressure within the spring rebound compression chamber 36 cannot be properly relieved by the flow through the orifice 79, then this excessive pressure will move the valve 75 against the effect of the spring 76 from engagement with the annular valve seat 71, thereby establishing a restricted flow of fluid through the side opening 81 and around the valve 75 into the passage 53 from whence the fluid will flow through cross passage 91 into the duct 40 and into chamber 37 through the orifice 71 and past the now opened valve 47. As the valve 75 is moved against the effect of said spring 76 the rectangular head 68 of the pin 69 will slide in the wear piece shank 65 thus it may be seen that the metering pin 69 not only controls the flow of fluid through the orifice 79, but it also supports the shank portion 78 of the valve 75.

From the aforegoing it may be seen that applicant has provided a double acting shock absorber of simple structure and design, the effective operation of which may be varied by adjustment of the valve 75 or replacement of the block 60 by one having an orifice of different size, or by both adjustment and replacement of the fluid controlling devices.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination a casing providing a cylinder, a piston reciprocable in said cylinder and forming a compression chamber therein, said piston having a passage providing a port for the transfer of fluid from one side of the piston to the other; a valve yieldably urged to close said port, said valve having a longitudinal passage; and a metering pin in said valve, for controlling the flow of fluid through the longitudinal passage in the valve, said metering pin providing a support for one end of the valve.

2. A shock absorber comprising, in combination a casing providing a cylinder, a piston reciprocable in said cylinder and forming a compression chamber therein, said piston having a passage providing a port for the transfer of fluid from one side of the piston to the other; a valve; a spring yieldably urging the valve to close the port; a duct in said valve, one portion of which is interiorly threaded, another portion being restricted to provide a fluid flow orifice; and a metering pin supported within the duct in the valve, said pin having a tapered end for controlling the flow of fluid through the valve orifice, the other end slidably engaging the piston to support the valve, the valve being adjustable rotatably relative to the pin which is not rotatable relative to the piston.

3. A shock absorber comprising, in combination a casing providing a cylinder; a piston reciprocable in said cylinder and forming a compression chamber therein, said piston having a passage providing a port for the transfer of fluid from one side of the piston to the other; a valve yieldably urged to close the port, said valve having an orifice adapted to establish a flow of fluid through it and being movable from the port in response to fluid pressure to establish a flow of fluid around it, and a metering pin threadedly engaging the valve, said metering pin restricting the flow of fluid through the valve, and being slidably but non-rotatably carried by the piston, the valve being rotatable relative to the pin to vary the restriction of the flow through the orifice.

4. A shock absorber comprising, in combination, a casing providing a cylinder; a piston in said cylinder, forming a compression chamber therein, and having a duct for the transfer of fluid from one side of the piston to the other; a valve in said duct preventing the flow of fluid from the compression chamber through said duct; a passage through the piston, having an annular valve-seat at its one end; a recessed wear piece fitting into the other end of said passage; a piston operating member engaging the wear piece; a valve in the passage yieldably urged upon the annular valve-seat to close the passage, said valve having a longitudinal passage; a metering pin slidably but non-rotatably supported by the recessed wear piece, threadedly engaging the valve and having a tapering end for restricting the flow of fluid through the longitudinal passage of the valve; and a cross-passage connecting the passage and duct in the piston.

5. A shock absorber comprising, in combination, a casing providing a cylinder, a piston in said cylinder forming a compression chamber therein said piston having a fluid passage therethrough; a pin having one end slidably and non-rotatably supported by the piston, the other end being tapered; a valve having an orifice, said valve being adjustably supported upon the pin so that the tapered end of the pin extends into the orifice to restrict the flow of fluid therethrough; and a spring urging the valve to close the piston passage.

6. A shock absorber comprising, the combination, a casing providing a cylinder; a piston in said cylinder forming a compression chamber therein said piston having a fluid passage therethrough; two spaced wear-pieces carried by the piston in spaced relation; a piston operating member extending between and engaging said wear-pieces; a pin having a rectangular end slidably but non-rotatably supported in the one wear-piece, the other end of the pin being tapered; an orificed valve screw-threadedly supported upon the pin so that the tapered end of the pin extends into the valve orifice to restrict the flow of fluid therethrough, said valve being rotatably relative to the pin to vary the said restriction to the flow of fluid through its orifice; a spring urging the valve to close the piston passage; and another spring of greater tension than the first mentioned spring for urging the second wear-piece against the piston operating member and said member against the first mentioned wear-piece.

7. A double acting shock absorber comprising, in combination, a casing providing a cylinder and a fluid reservoir; a piston in said cylinder forming a compression chamber at each end thereof said piston having a passage for the transfer of fluid from one compression chamber into the other; means for operating the piston; a valve yieldably urged to close one end of the piston passage and being movable in response to pressure to establish a restricted flow of fluid from the compression chamber at its respective end of the cylinder into the compression chamber at the opposite end of the cylinder, said valve having an orifice to establish a constantly restricted flow of fluid between the compression chambers without movement of the valve with regard to the piston; a metering pin screw threadedly carried by the valve and slidably but non-rotatably supported in the piston, said metering pin having a tapered end for restricting the flow of fluid through said valve, the pin being adjustable relative to the valve to vary the restriction to the flow of fluid through said valve, by rotation of the valve relative to said pin; and a constant flow orifice in the other end of the piston passage for restricting the flow of fluid from the compression chamber adjacent thereto into the compression chamber adjacent the valve.

8. A double acting shock absorber comprising, in combination, a casing providing a cylinder; a piston in said cylinder forming two compression chambers therein said piston having a longitudinal passage providing for the transfer of fluid between the compression chambers; a fluid flow controlling device at one end of the piston for establishing a substantially constantly restricted flow of fluid through the piston in one direction; a fluid flow controlling device at the other end of the piston adapted first to establish a constantly restricted flow of fluid through the piston in the opposite direction and, in response to increasing fluid pressures another, variably restricted flow in said opposite direction, said last mentioned fluid flow controlling device comprising a spring loaded valve and a metering pin, adjustable by rotation of the valve to alter the constantly restricted flow passage; fluid replenishing valves in the piston; and means for reciprocating the piston within the cylinder.

In testimony whereof I hereto affix my signature.

WILLIAM A. CHRYST.